April 26, 1932.  H. F. FRYLING  1,856,051
GASKET
Filed Feb. 19, 1930
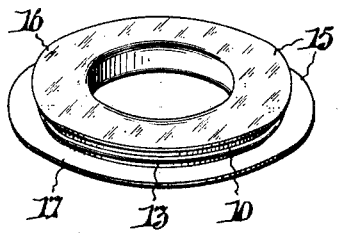
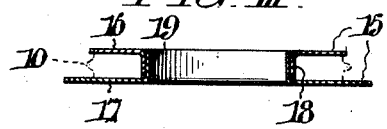
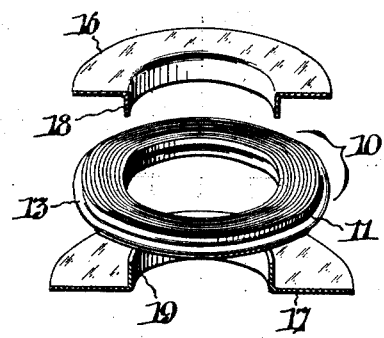
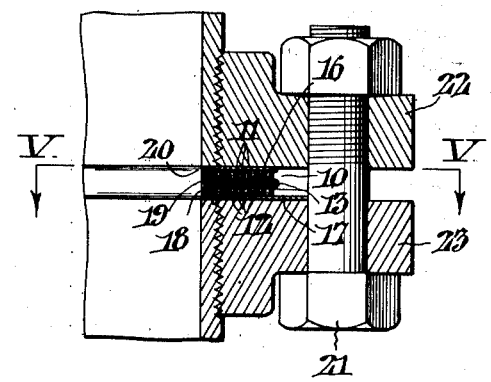
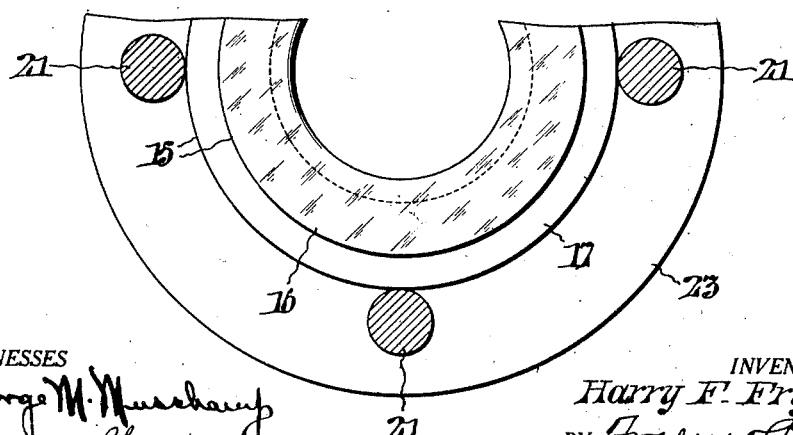
INVENTOR:
Harry F. Fryling, Patented Apr. 26, 1932                                        1,856,051

UNITED STATES PATENT OFFICE

HARRY F. FRYLING, OF MERCHANTVILLE, NEW JERSEY, ASSIGNOR TO "FLEXITALLIC" GASKET CO., OF CAMDEN, NEW JERSEY, A CORPORATION OF NEW JERSEY

GASKET

Application filed February 19, 1930. Serial No. 429,530.

This invention relates to compressible gaskets intended for interposition between the flanges of pipe joints and the like for the purpose of insuring fluid tightness. More specifically, my invention has reference to the flat ring type of gasket shown and described in U. S. Patent #1,089,134, granted to Charles F. Hettinger on March 3, 1914, wherein convolutions of strip metal with a longitudinal corrugation alternate with convolutions of non-metallic packing material, and wherein the corrugation of one convolution of the metallic strip interlaps with the corrugation of another.

The main objects of my invention are to enhance the efficiency of compressible gasket rings—particularly gasket rings of the kind referred to—by providing them with a protective sheathing of pliant sheet metal; and to render such gaskets self-centering by circumferentially extending the sheathing beyond the compressible ring with formation of a flange adapted to reach substantially to the bolts connecting the opposing pipe flanges.

Other objects and attendant advantages will be manifest from the following description in connection with the attached drawings wherein Fig. I is a perspective view of my improved gasket.

Fig. II is an exploded view of the parts constituting the gasket.

Fig. III is a diagrammatic sectional view showing how the parts of the gasket are assembled.

Fig. IV is a fragmentary sectional view of a pipe flange joint with my improved gasket clamped in place to seal the joint; and Fig. V is a partial cross sectional view of the pipe flange joint taken as indicated by the arrows V—V in Fig. IV.

With more detailed reference to these illustrations, the numeral 10 comprehensively designates a flat gasket ring constructed after the manner described in the patent supra, i. e. with convolutions 11 of soft strip metal like aluminum, for example alternating with convolutions 12 of asbestos or other compressible packing material, and with the longitudinal corrugation 13 of one convolution of the strip metal interlapping with the corrugation 13 of another. In carrying out my invention, I provide the flat ring 10 with a sheathing 15 of sheet copper or other relatively pliant metal capable of adapting itself conformatively to irregularities in the opposing surfaces of a pipe joint incident to compression of the gasket between them. As shown, the sheathing 15 comprises upper and lower disk sections 16, 17 formed respectively with complemental perpendicular flanges 18, 19 around central apertures, said flanges being adapted to interengage telescopically within the opening of the ring 10 after the manner illustrated in Fig. III. To secure the several component parts of the gasket together, the flange 19 of the sheathing section 17 is expanded over the flange 18 of the companion sheathing component 16 as shown at 20 in Fig. IV. The upper sheathing section 16 is made to a diameter corresponding substantially to that of the ring 10; while the lower sheathing section 17 is made to a larger diameter with considerable circumferential projection beyond said ring 10. The sheathing 15 thus affords an extended flange, which, as shown in Figs. IV and V, is adapted to reach to the bolts 21 connecting the flanges 22, 23 of a pipe joint, the gasket being thereby rendered self-centering.

It is to be noted particularly that the sheathing 15 covers the ring 10 at the top and bottom and peripherally of its opening but not around its outside edge, so that said ring is left free to expand radially incident to compression between the pipe flanges 22, 23. In addition to being shielded top and bottom, the compressible ring 10 is accorded highly efficient protection where it is most needed to wit: around its inner periphery which would ordinarily be directly exposed to the fluid passing through the pipe—the telescoping annular flanges 18, 19 of the sheathing components 16, 17 constituting, in effect, a double wall safe-guard or barrier against leakage at the indicated region.

While I prefer to employ a compressible ring having the construction of the patent supra, I do not wish to be limited in this regard since compressible rings otherwise constructed may be readily substituted without departing from the spirit of my invention. In addition to the advantages already pointed out, the sheathing 15 obviously serves to protect the compressible ring 10 against injury and disintegration through rough handling during application of the gasket to the pipe joint. When the gasket is compressed in a pipe joint, the edges of the metal strip 11 engage the sheathing 15, which coacts with them (being pliant and soft) to resist expansion of the ring 10.

Having thus described my invention, I claim:

1. A gasket comprising a flat ring of compressible material; and a protective sheathing of pliant sheet metal including a top disk of substantially the same diameter as the ring and a bottom disk of larger diameter, said disks having opposing perpendicular flanges around central openings engaging telescopically within the opening of the ring, and one of said disks being expanded over the other to hold the several parts in assembly.

2. A gasket comprising a flat compressible ring wherein convolutions of soft strip metal, having a longitudinal corrugation, alternate with convolutions of non-metallic packing material, and wherein the corrugation of one convolution of the strip metal interlaps with the corrugation of another; in combination with a protective sheathing of pliant sheet metal having circumferential projection beyond the compressible ring, but leaving its periphery open and free to expand.

3. A self-centering gasket for pipe flange joints comprising a flat compressible ring wherein convolutions of soft strip metal, having a longitudinal corrugation, alternate with convolutions of non-metallic packing material, and wherein the corrugation of one convolution of the strip metal interlaps with the corrugation of another; in combination with a protective sheathing of pliant sheet metal affording a circumferential flange to reach to the bolts connecting the pipe flanges.

In testimony whereof, I have hereunto signed my name at Camden, New Jersey, this 14th day of February, 1930.

HARRY F. FRYLING.